(12) United States Patent
Bendersky

(10) Patent No.: US 10,747,900 B1
(45) Date of Patent: Aug. 18, 2020

(54) DISCOVERING AND CONTROLLING SENSITIVE DATA AVAILABLE IN TEMPORARY ACCESS MEMORY

(71) Applicant: CyberArk Software Ltd., Petach-Tikva (IL)

(72) Inventor: Arthur Bendersky, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/543,788

(22) Filed: Aug. 19, 2019

(51) Int. Cl.
| H04L 29/06 | (2006.01) |
| G06F 21/62 | (2013.01) |
| G06F 21/54 | (2013.01) |
| G06F 21/57 | (2013.01) |

(52) U.S. Cl.
CPC .......... *G06F 21/6245* (2013.01); *G06F 21/54* (2013.01); *G06F 21/577* (2013.01)

(58) Field of Classification Search
CPC .... G06F 21/6245; G06F 21/629; G06F 21/54; G06F 21/60; G06F 21/62; G06F 21/31; G06F 21/32; G06F 21/51
See application file for complete search history.

(56) References Cited

U.S. PATENT DOCUMENTS

| 7,581,099 | B2 * | 8/2009 | Ong | G06F 21/34 |
| | | | | 713/170 |
| 7,823,186 | B2 * | 10/2010 | Pouliot | G06F 21/53 |
| | | | | 726/1 |
| 8,402,224 | B2 * | 3/2013 | Bruening | G06F 9/3851 |
| | | | | 711/135 |
| 8,850,558 | B2 * | 9/2014 | Ong | G06F 21/34 |
| | | | | 726/18 |
| 9,251,323 | B2 * | 2/2016 | Graser | G06F 21/31 |
| 9,268,542 | B1 * | 2/2016 | Mars | G06F 9/5016 |
| 10,255,049 | B2 * | 4/2019 | Klemenz | G06F 8/456 |
| 2008/0276308 | A1 * | 11/2008 | Graser | G06F 21/31 |
| | | | | 726/6 |

* cited by examiner

*Primary Examiner* — Hosuk Song
(74) *Attorney, Agent, or Firm* — Finnegan, Henderson, Farabow, Garrett & Dunner, LLP

(57) ABSTRACT

Disclosed embodiments relate to systems and methods for discovering and controlling sensitive data stored in temporary access memory. Techniques include identifying an application configured to perform one or more secure functions using sensitive data, wherein the application is configured to store or access the sensitive data in a temporary access memory accessible to the application; analyzing one or more processes associated with runtime activity of the application; detecting, based on the analyzing, an instance of the sensitive data, wherein the detecting is based on at least one of: analyzing input from a user to the application, or analyzing attributes of the application; and automatically implementing, based on the detecting, a control action to limit the accessibility of the sensitive data in the temporary access memory.

20 Claims, 6 Drawing Sheets

```
<div class="col-50">
  <h3>Check Out</h3>
  <label for="fname">Accepted Credit Cards</label>   ← 202
  <div class="icon-container">
    <i class="fa fa-cc-mastercard" style="color:green;"></i>
    <i class="fa fa-cc-visa" style="color:blue;"></i>
    <i class="fa fa-cc-amex" style="color:red;"></i>
  </div>
  <label for="cname">Name on Credit Card</label>   ← 203
  <input type="text" id="cname" name="cardname" placeholder="John More Doe">
  <label for="ccnum">Credit Card Number</label>   ← 204
  <input type="text" id="ccnum" name="cardnumber" placeholder="1111-2222-3333-4444">
  <label for="expmonth">Expiration Date</label>
  <input type="text" id="expmonth" name="expmonth" placeholder="September">

<div class="row">
    <div class="col-50">
      <label for="expyear">Exp Year</label>
      <input type="text" id="expyear" name="expyear" placeholder="2018">
    </div>
    <div class="col-50">
      <label for="cvv">CVV</label>
      <input type="text" id="cvv" name="cvv" placeholder="352">
    </div>
  </div>
</div>
```

Fig. 2

DISCOVERING AND CONTROLLING SENSITIVE DATA AVAILABLE IN TEMPORARY ACCESS MEMORY

BACKGROUND

One effective way for attackers to gain unauthorized access to passwords, credentials, secrets, and other sensitive data is through memory scraping. By analyzing the memory contents of a device (e.g., RAM memory, browser cache, application cache, etc.), malicious entities may discover this information and use it for numerous harmful purposes, including identity theft, impersonation, financial fraud, and more.

Attacks of this type are a significant threat because numerous types of applications use secrets during normal operation. For example, when users of Microsoft Windows™-based machines utilize their Remote Desktop Connection™ (RDC) or Remote Desktop Protocol™ (RDP) client (e.g., the mstsc.exe client) to access remote technical support (e.g., from an administrator), the remote access is provisioned using a credential. Often, this is a powerful credential (e.g., an administrator's credential or root credential) that can provide broad and deep access throughout the client machine itself and also potentially throughout other networked machines. Because this remote access technique involves storing, at least temporarily, the credential in memory of the client machine, the memory of the client machine is a highly vulnerable attack surface. If attackers are able to monitor or access the memory (e.g., RAM or otherwise) of client machines and obtain powerful administrator credentials, the attackers may have immense power to steal, misuse, and misappropriate data, applications, and documents throughout a network environment. Many other thin clients (e.g., PuTTY, SQL*Plus, Independent Computing Architecture, PC-over-IP, etc.), IT management tools (e.g., Windows Command Prompt™, Windows PowerShell™, etc.), and software scripts (e.g., in languages such as Python, AutoIt, etc.), use secrets stored in memory for their operation as well, and pose similar threats.

Internet browsers (e.g., Internet Explorer™, Chrome™, Safari™ Firefox™, etc.) pose additional risks for the theft and misuse of sensitive data. For example, browsers can access a plethora of websites that have log-in (e.g., username and password) prompts, such as social media sites, virtual private network (VPN) sites, personal medical or financial sites, and many more. When users interact with such sites, and optionally use add-on password manager software (e.g., password managers built into Chrome™, Internet Explorer™, etc. or third-party password managers), user credentials are often stored in memory. Additionally, not only are browsers used to enter log-in credentials, but they are also used to prompt users to enter personally sensitive data (e.g., medical, financial, social, etc.). This data may also be stored in memory on a client machine and thus vulnerable to scraping or memory dump attacks.

Further, cloud computing resources (e.g., virtual machines, container instances, etc.) often utilize secrets and other sensitive data during their operation. For example, when a container instance is configured to authenticate itself to a backend server, or to access data from a secure database, a credential or token is often required. Nevertheless, cloud computing systems do not automatically wipe memory utilized by virtual instances. Instead, the virtual instances are processes within an operating system, and the temporary memory utilized by the virtual instances is often preserved throughout the existence of the instance and potentially even longer. Accordingly, this temporary memory is also an attack surface.

There are no effective techniques available to control the exposure of sensitive data and secrets in local memory on computing devices. Indeed, there are many technological hurdles that make effective solutions difficult to achieve.

For example, many applications are designed to store credentials and other sensitive data in clear-text in local memory (e.g., RAM or otherwise). Applications of this type range from browsers, to specific-purpose applications (e.g., social media or business applications), to password manager applications, and more. For these applications, the existence of secrets and other sensitive data in local memory is a security threat.

Many of these applications are not designed to effectively or easily wipe the memory of secrets and other sensitive data. Often, it is up to a developer's particular implementation to implement memory wiping, and thus the process is susceptible to errors and oversights. For example, in C++ the developer may need to call the SecureZeroMemory( . . . ) WinAPI function with respect to a secrets buffer. In C #, a developer may need to use the SecureString object in order to wipe memory. These techniques are thus incomplete and difficult to fully implement.

These difficulties are compounded by the fact that many programming languages do not provide a mechanism for wiping memory. For example, in Python, string objects are not changeable after they are created. Thus, even if a string associated with a password is deleted, there would likely be other instances of the password associated with other string operations. Similarly, in AutoIt, passwords and other credentials cannot be completely encrypted and protected from access. Attackers can decompile AutoIt code and fetch credentials from memory even if encryption is used. Accordingly, in these languages it is very difficult if not impossible to ensure the protection of credentials and other sensitive data that is stored in local memory. Similarly, many types of third-party software that organizations and individuals use may not have a way to comprehensively or accurately wipe memory of passwords or other data. For third-party software, organizations and individuals lack access to the software itself and thus cannot attempt to remedy these problems.

When secrets and other sensitive data are not wiped from memory when a process or application terminates, they may reside in memory for a potentially lengthy period of time. Some operating systems (e.g., Windows™) do not automatically clear memory of credentials and other data when processes terminate, and thus these sensitive elements of data may remain in memory indefinitely. This prolongs the existence of the memory as an attack surface and extends the vulnerabilities of memory-based attacks. Attack tools such as Mimikatz and others may then be used to steal credentials and other data from memory.

Accordingly, in view of these and other deficiencies in existing techniques for managing credentials and other sensitive data, technological improvements are needed in order to more securely, comprehensively, and adaptively identify and control such data. Improvements and solutions to these and other technological problems are discussed in detail below.

SUMMARY

Various disclosed embodiments describe non-transitory computer readable media, systems, and methods for discovering and controlling sensitive data stored in temporary access memory.

For example, in an exemplary embodiment, there may be a non-transitory computer readable medium including instructions that, when executed by at least one processor, cause the at least one processor to perform operations for identifying an application configured to perform one or more secure functions using sensitive data, wherein the application is configured to store or access the sensitive data in a temporary access memory accessible to the application; analyzing one or more processes associated with runtime activity of the application; detecting, based on the analyzing, an instance of the sensitive data, wherein the detecting is based on at least one of: analyzing input from a user to the application, or analyzing attributes of the application; and automatically implementing, based on the detecting, a control action to limit the accessibility of the sensitive data in the temporary access memory.

According to a disclosed embodiment, analyzing the input from the user to the application comprises performing character recognition on data input by the user.

According to a disclosed embodiment, the data input by the user is detected based on an action performed by the user that precedes the data input.

According to a disclosed embodiment, analyzing the attributes of the application comprises identifying an application programming interface associated with the application that has a function involving the sensitive data.

According to a disclosed embodiment, the application programming interface is an operating system application programming interface.

According to a disclosed embodiment, analyzing the attributes of the application comprises detecting a response from an application programming interface hook.

According to a disclosed embodiment, analyzing the attributes of the application comprises analyzing cached text associated with the application.

According to a disclosed embodiment, analyzing the attributes of the application comprises identifying interface elements of the application.

According to a disclosed embodiment, the control action comprises at least one of: invoking a kernel driver, flushing the temporary access memory, generating an alert regarding the sensitive data, rotating a credential associated with the sensitive data or the user, or generating a prompt to the user.

According to a disclosed embodiment, the sensitive data comprises at least one of: a credential or secret of the user, sensitive financial information of the user, sensitive personal information of the user, or a privileged access token.

According to another disclosed embodiment, there may be a computer-implemented method for discovering and controlling sensitive data stored in temporary access memory. The method may comprise identifying an application configured to perform one or more secure functions using sensitive data, wherein the application is configured to store or access the sensitive data in a temporary access memory accessible to the application; analyzing one or more processes associated with runtime activity of the application; detecting, based on the analyzing, an instance of the sensitive data, wherein the detecting is based on at least one of: analyzing input from a user to the application, or analyzing attributes of the application; and automatically implementing, based on the detecting, a control action to limit the accessibility of the sensitive data in the temporary access memory.

According to a disclosed embodiment, the temporary access memory is a random access memory.

According to a disclosed embodiment, the temporary access memory is a browser cache.

According to a disclosed embodiment, the control action is implemented before the one or more processes terminate.

According to a disclosed embodiment, the instance of the sensitive data is predetermined before the detecting.

According to a disclosed embodiment, the detecting comprises both analyzing the input from the user to the application and analyzing the attributes of the application.

According to a disclosed embodiment, analyzing the input from the user to the application comprises performing character recognition on data input by the user.

According to a disclosed embodiment, analyzing the attributes of the application comprises identifying an application programming interface associated with the application that has a function involving the sensitive data.

According to a disclosed embodiment, analyzing the attributes of the application comprises detecting a response from an application programming interface hook.

According to a disclosed embodiment, analyzing the attributes of the application comprises analyzing cached text associated with the application.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 2 is a block diagram of exemplary web page content that may be analyzed for instances of sensitive data entry in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of discovering and controlling sensitive data stored in temporary access memory disclosed herein overcome several technological problems in the fields of credentials management, data privacy, and network security. As described below, various techniques may be used to identify the entry of secrets or other sensitive data during application sessions. For example, optical character recognition may identify obfuscation characters (e.g., "*******") in an interface, indicating that a password or other credential is being entered. Further, various types of operating system application programming interfaces (APIs) may detect prompts for entry of credentials or the entry of credentials themselves. Additionally, textual analysis may be applied to web page content or other application content to identify instances of terms indicating entry of sensitive data (e.g., "password," "credit card," "social security number," etc.). Further techniques may analyze specific properties (e.g., Windows™ UI Automation properties, etc.) associated with GUI elements, which may indicate entry of secrets or other sensitive data. Additional techniques may utilize prior knowledge of secrets (e.g., known secrets or (fictitious) decoy secrets in order to identify when those secrets are textually found in an application session.

When instances of sensitive data are identified, control actions may automatically be implemented in order to control the availability or existence of the secrets in local memory. For example, kernel drivers may be implemented to protect the memory by wiping the memory or selectively deleting the sensitive data that was identified. For added security, this wiping or deleting process may be implemented before an application session terminates. Various other control actions (e.g., generating reports or alerts, rotating credentials, prompting users to update credentials, preventing keystroke logging, etc.) may be implemented as well.

Reference will now be made in detail to the disclosed embodiments, examples of which are illustrated in the accompanying drawings.

Figure 1:
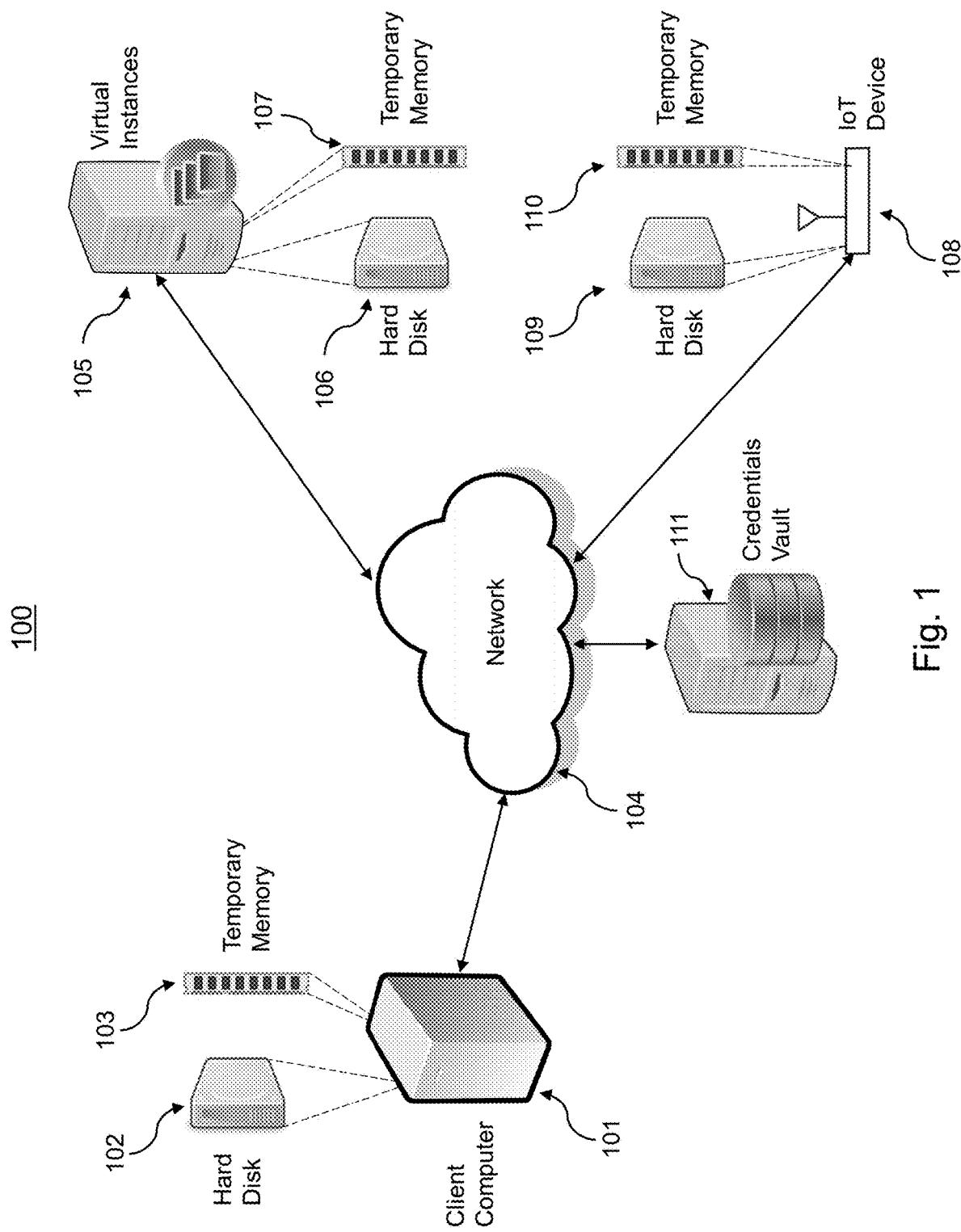
FIG. 1 is a block diagram of an exemplary system for discovering and controlling sensitive data stored in temporary access memory in accordance with disclosed embodiments.

FIG. 1 illustrates a block diagram of an exemplary system 100 for discovering and controlling sensitive data stored in temporary access memory. While FIG. 1 includes a variety of different computing devices having particular types of data storage or memory, fewer or additional devices may be implemented in accordance with the disclosed techniques. In various embodiments, those devices may correspondingly have fewer or additional data storage or memory components.

As illustrated in FIG. 1, system 100 may include one or more client computer 101 having a hard disk 102 and/or temporary memory 103. In various embodiments, client computer may take several different forms. For example, client computer 101 may be a personal computer (e.g., desktop, laptop, micro PC, etc.), a handheld device (e.g., a mobile phone, a tablet, or a notebook), a wearable device (e.g., a smart watch, smart jewelry, an implantable device, a fitness tracker, smart clothing, a head-mounted display, etc.), or various other types of devices capable of processing and/or receiving data.

Hard disk 102 may be a long-term memory of client computer 101 configured for storage of applications and data. For example, hard disk 102 may store one or more operating systems, applications, documents, and data used at client computer 101. Accordingly, hard disk 102 may be one or more hard drives or disk drives manufactured by entities such as Seagate™, Toshiba™, Samsung™, Western Digital™, or others. Temporary memory 103, on the other hand, may be a temporary access memory (e.g., RAM, SRAM, DRAM, SDRAM, Flash memory, etc.) that is used to temporarily store data, credentials, files, firmware, or applications. In some embodiments, temporary memory 103 may be, or may store, a browser cache, application cache, or other cache memory. In contrast to hard disk 102, which may be slower to access but have higher storage volume, temporary memory 103 may be quicker to access yet have smaller storage volume. Applications running on client computer 101 may access temporary memory 103 for various runtime tasks, such as temporarily storing data or application code used in the execution of an application, temporarily storing web browser cache contents, temporarily storing user-entered credentials or other sensitive data, among various other tasks.

As discussed further below, when applications store, at least temporarily, secrets or other sensitive data in temporary memory 103, an attack surface is created for malicious users to penetrate. If an attacker has access to client computer 101 (e.g., local privileges on client computer 101, or network administrator privileges encompassing client computer 101), they may be able to scrape the contents of temporary memory 103 and harvest any credentials or other sensitive data stored there. While in many cases such secrets or sensitive data are stored by applications in temporary memory 103, in some situations they are stored in hard disk 102. For example, if temporary memory 103 is full and overwriting its contents is not enabled, overflow data may be stored in hard disk 102, at least temporarily until temporary memory 103 has available storage space. In that situation, the techniques discussed below may be applied to either or both of temporary memory 103 or hard disk 102.

System 100 may also include one or more virtual computing instances 105. Virtual computing instances 105 may be a variety of types of cloud computing resources, such as virtual machines, container instances, next-generation containers, serverless code, etc. As such, virtual computing instances 105 may be built on a variety of virtualization platforms, such as Amazon Web Services™, Microsoft Azure™, Microsoft Containers™, Docker Containers™, Kubernetes™, and various others. In some embodiments, virtual computing instances 105 may communicate with each other and/or with other resources in system 100 (e.g., client computing devices 101, IoT devices 108, or credentials vault 111). For example, virtual computing instances 105 may host remotely running applications accessible to these other resources, may provide virtual computing storage or data access to these other resources, or may provide other services. Further, virtual instances 105 may have secure functionality involving credentials or sensitive data. For example, virtual instances 105 may have functionality that involves authenticating themselves to secure servers, databases, or other virtual instances 105. In these instances, as with client computer 101, secrets and sensitive data may be stored in temporary memory 107.

Virtual instances 105 may operate on a software-as-a-service (SaaS) framework, a platform-as-a-service (PaaS) framework, a storage-as-a-service framework, or other types of frameworks. Each of virtual instances 105 may have an associated hard disk 106 (e.g., similar to hard disk 102) and temporary memory 107 (e.g., similar to temporary memory 103). In some embodiments (e.g., virtual machines), each virtual instance 105 may have its own dedicated and discrete hard disk 106 and temporary memory 107, while in other embodiments (e.g., container instances or serverless code) two or more virtual instances 105 may share some or all of a hard disk 106 or temporary memory 107.

System 100 may also include one or more IoT devices 108. In accordance with FIG. 1, IoT devices 108 may take many different forms. For example, IoT devices 108 may be sensor devices, video surveillance equipment, smart home appliances, smart power grid devices, autonomous vehicles, network-enabled parking garage equipment, network-enabled lighting or sound equipment, or various other types of devices. Similar to computing devices 101, IoT devices 108 may each have an associated (e.g., integrated or accessible) hard disk 109 and temporary memory 110, which may be similar, respectively, to hard disk 102 and temporary memory 103.

In some embodiments, system 100 may further include a credentials vault 111, such as a CyberArk™ vault. In such embodiments, credentials vault 111 may securely store credentials for use by, or on behalf of, resources such as client computers 101, virtual instances 105, and IoT devices 108. The credentials may include, for example, passwords, tokens, cryptographic keys, and other secrets useable for authenticating or authorizing secure access to resources in system 100. As an illustration, client computers 101 may be prompted for authentication before they can access an application hosted by a virtual instance 105, and upon a successful authentication a credential from credentials vault 111 may be asserted to the virtual instance 105 in order to provide access for the client computer 101. While in some instances client computer 101 may never receive a copy of such credentials (even temporarily), in other embodiments (including with other forms of credentials services) credentials may be stored a client computer 101. In such latter embodiments, the credentials may be stored in temporary memory 103 of client computer 101. As another illustration, IoT devices 108 may be provided with embedded credentials, which they may use to authenticate themselves to credentials vault 111. Upon a successful authentication, a credential from vault 111 may be provided to IoT devices 108 (e.g., stored in temporary memory 110) or asserted on behalf of IoT devices 108.

As illustrated in FIG. 1, client computers 101, virtual instances 105, and IoT devices 108 may communicate via network 104. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, NFC, infrared, etc.), or various other types of network communications. In some embodiments, the communications may take place across two or more of these forms of networks and protocols.

FIG. 2 illustrates an exemplary web page interface 200, including content that may be analyzed for instances of sensitive data entry. In accordance with FIG. 2, interface 200 may be a browser interface (e.g., Chrome™, Internet Explorer™, Safari™, etc.), which may be a desktop or PC version of such a browser, a mobile version of such a browser, or another format-modified version of such a browser. Consistent with FIG. 1, interface 200 may be received or rendered by client computers 101, virtual instances 105, or IoT devices 108.

Interface 200 may be built on technologies such as HTML, JavaScript, CSS, SQL, XML, etc. Interface 200 may expose its underlying programming content in several ways. For example, when a web page document is received at a computing resource (e.g., client computer 101), the web page document may be parsed in its original textual format. Further, some browsers allow for the "source" of web documents to be inspected, such as through the "view source" tool in Internet Explorer™ or the "view page source" tool in Chrome™. Using these techniques, the textual source content 201 of a web page may be analyzed. Accordingly, the analysis of the textual source content 201 may be performed by a dedicated security application running locally (e.g., on client computers 101, virtual instances 105, or IoT devices 108), or a remotely running application (e.g., at a security server). In the example web page of FIG. 2, the web page is an e-commerce purchase page, allowing a user to purchase an item with a credit card. Of course, other types of web pages are possible as well, as well as non-web pages (e.g., intranet pages).

Once the textual source of the web page is accessed, various types of textual analysis may be performed to determine whether the page calls for the user to enter sensitive data. For example, textual analysis may be performed to determine whether source content 201 includes terms such as "credit card," "social security number," "SSN," "password," "username," or others. In the example of FIG. 2, source content 201 includes several instances 202, 203, 204 of the term "credit card" in the web page. Based on this, as discussed further below, a determination may be made that the web page is calling for the entry of sensitive data which may be stored (at least temporarily) in temporary access memory (e.g., memory 103, 107, 110). In some embodiments, the textual analysis may be compound in nature. For example, the analysis may require that at least two sensitive words appear (e.g., "username" and "password"), or may further require that the two or more sensitive words appear within a defined range of each other (e.g., within 50 words).

In some embodiments, not only the existence of textual content (e.g., "credit card") may be analyzed in source content 201, but also the location of such textual content may be identified. For example, in embodiments where source content 201 is expressed as a programming text file having line numbers, the particular line or lines containing the sensitive terms may be identified. Further, in some embodiments source content 201 may further be analyzed to determine whether source content 201 includes any commands to wipe sensitive data from memory (e.g., at the end of a session). As discussed further below, in instances where source content does not include any command to wipe sensitive data from memory (e.g., from memory 103, 107, 110), the web page may be classified as potentially insecure.

Figure 3:
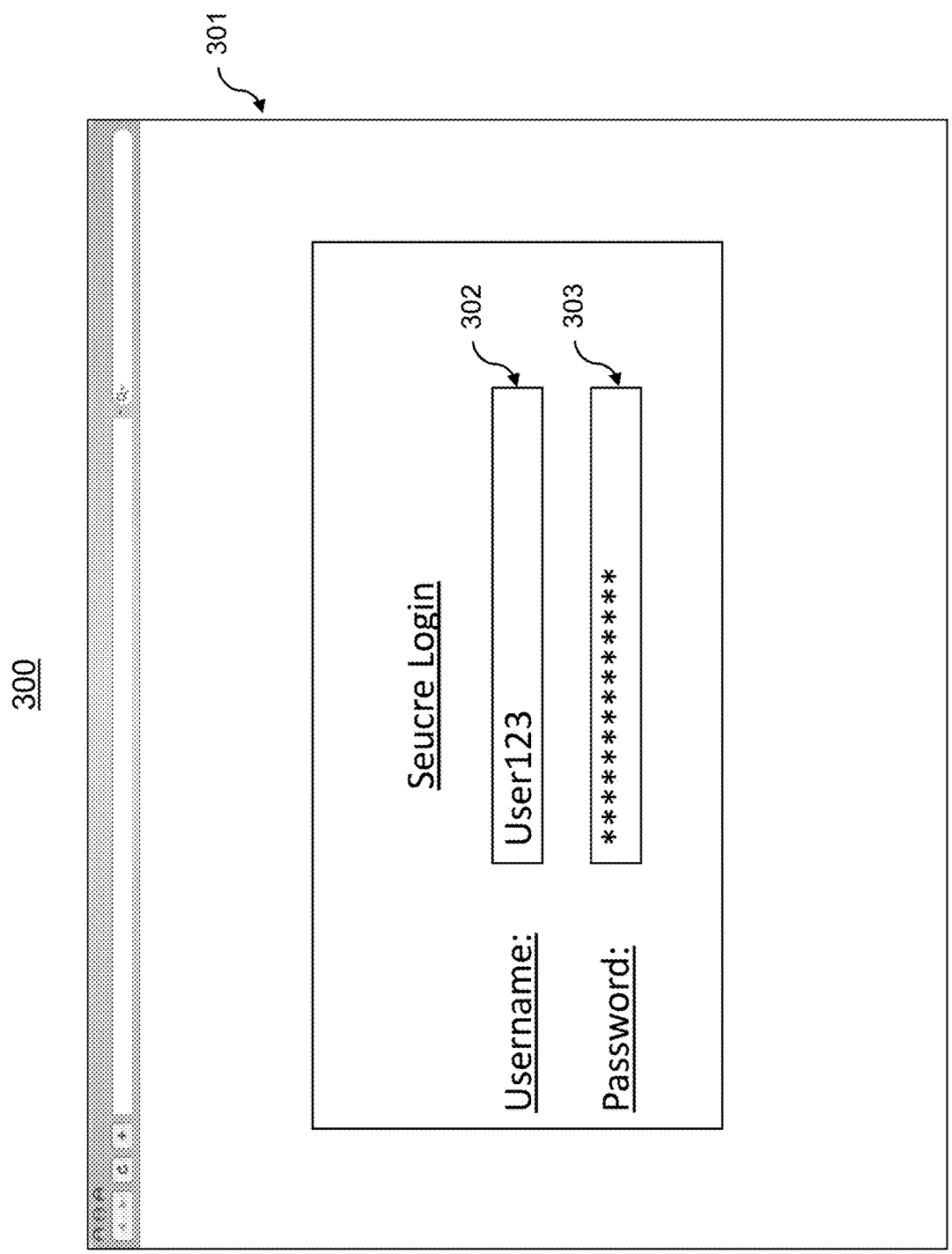
FIG. 3 is a block diagram of an exemplary secure login interface that may be analyzed for instances of sensitive data entry in accordance with disclosed embodiments.

FIG. 3 illustrates an exemplary secure login interface 300 that may be analyzed for instances of sensitive data entry. Interface 300 may be generated as part of a variety of different types of applications. For example, interface 300 may be a web browser interface, a mobile application interface, a business application interface, or various other types of interfaces. Interface may be received or rendered by client computers 101, virtual instances 105, or IoT devices 108.

As illustrated, interface 300 may include a login interface 301 including fields for a user to enter a username 302 and password 303. Other login interfaces are possible as well, including interfaces where username field 302 and password field 303 are not presented concurrently, or where additional or different fields are presented. With reference to FIG. 1, the login interface 301 may permit a user (e.g., of client computers 101, virtual instances 105, or IoT devices 108) to verify their identity to another resource in system 100 or to an external resource.

A security application running locally on client computers 101, virtual instances 105, or IoT devices 108, or remotely at a security server, may analyze several aspects of interface 301. For example, in some embodiments an optical character recognition (OCR) analysis of interface 301 may be performed. This OCR analysis may look for instances of sensitive words indicating a user being prompted to input sensitive data (e.g., "password," "username," "credit card," "social security number," "SSN," etc.). Further, in some embodiments the OCR analysis may scan recognized characters to identify obfuscation characters (e.g., "**************" concealing from view a user's password). In situations where it is detected that a user is being prompted to enter sensitive data, a control action may be implemented, as discussed further below.

In addition, in some embodiments underlying application programming interfaces (APIs) of interface 301 may be analyzed. For example, in Windows™ operating system environments several different APIs use credentials, such as LogonUser\LogonUserEx, ChangeAccountPasswordA, KerbInteractiveUnlockLogonInit, CredPackAuthenticationBuffer, LsaLogonUser, LsaApLogonUser, CredUIPromptForCredentials, and various others. In some embodiments, the analysis may include determining that one of these functions is being invoked or called in a process on client computers 101, virtual instances 105, or IoT devices 108. In other embodiments, the actual code of the API may be analyzed. For example, with reference to the LogonUser API, the language "BOOL LogonUserA( . . . " may be searched for and identified. In either technique, if the API is associated with a logon process, such as those above, the identification of the API being called or its content may be an indication that a user is being prompted to enter sensitive data. In that event, as discussed further below, a control action may be implemented.

Figure 4:
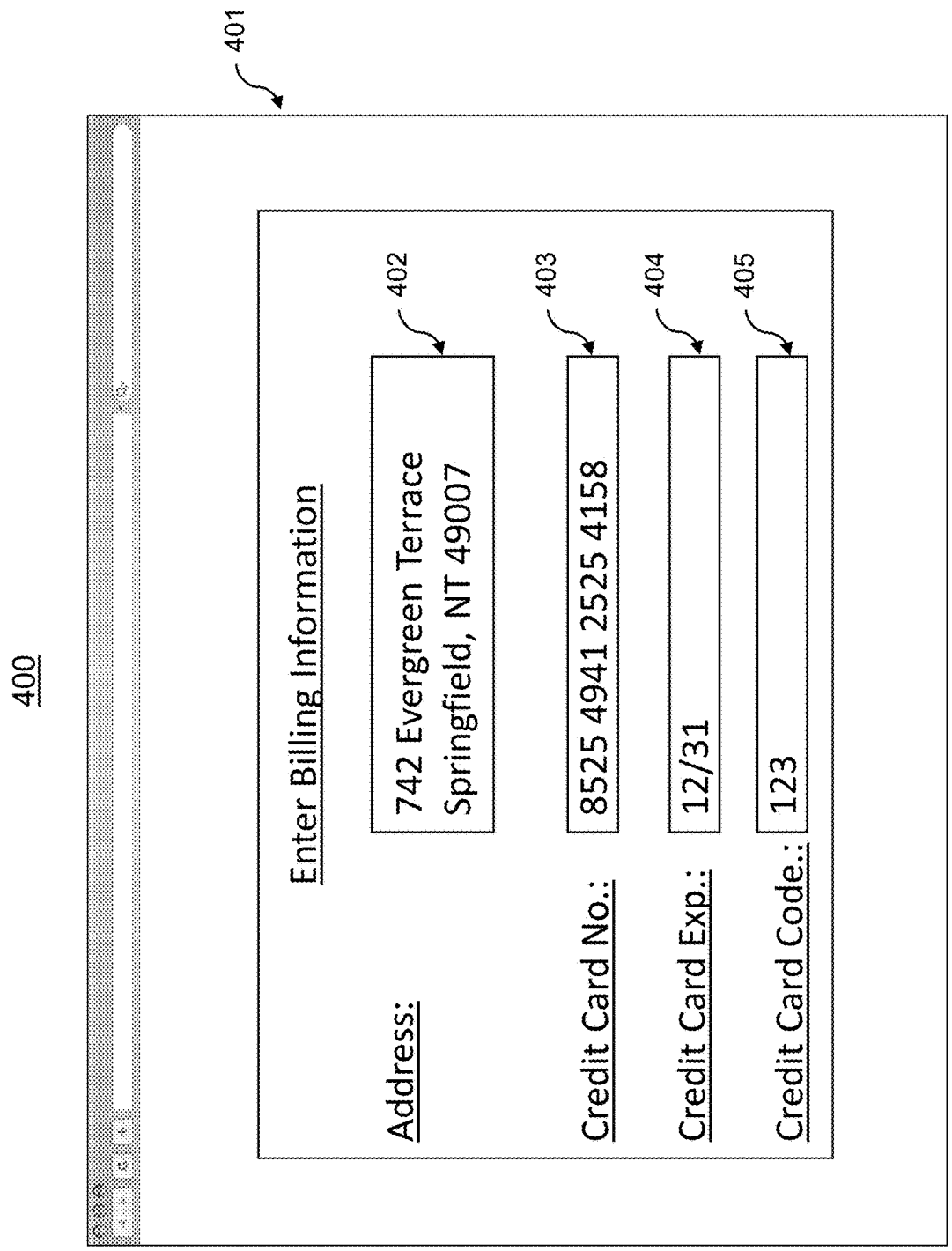
FIG. 4 is a block diagram of an exemplary financial transaction interface that may be analyzed for instances of sensitive data entry in accordance with disclosed embodiments.

FIG. 4 illustrates an exemplary financial transaction interface 400 that may be analyzed for instances of sensitive data entry. Similar to interfaces 200 and 300, interface 400 may be implemented in a variety of different types of applications, such as web browsers, mobile applications, business applications, e-commerce applications, etc. Interface 400 may be received or rendered by client computers 101, virtual instances 105, or IoT devices 108.

As shown in FIG. 4, a purchase order interface 401 may include user input fields, such as an address field 402, credit card number field 403, credit card expiration field 404, and credit card security number field 405. Fewer or additional fields may be included in purchase order interface 401, depending on the embodiment. Consistent with the embodiments above, the content of interface 401 may be analyzed in several different ways. For example, underlying source programming content (e.g., HTML, JavaScript, CSS, XML, etc.) of the interface 401 may be parsed for keywords such as "credit card," etc. In some embodiments, a combination of keywords may be sought, such as "credit card" and "address." In further embodiments, OCR techniques may be applied to interface 401 or the text input by a user. In such situations, keywords (e.g., "credit card") or obfuscation characters (e.g., "*****") may be identified. When such keywords are identified, either as part of a scan of a running process including interface 401 or interface 401 itself), it may be determined that a user is being prompted to enter sensitive data. In that event, as discussed further below, a control action may be implemented.

Figure 5:
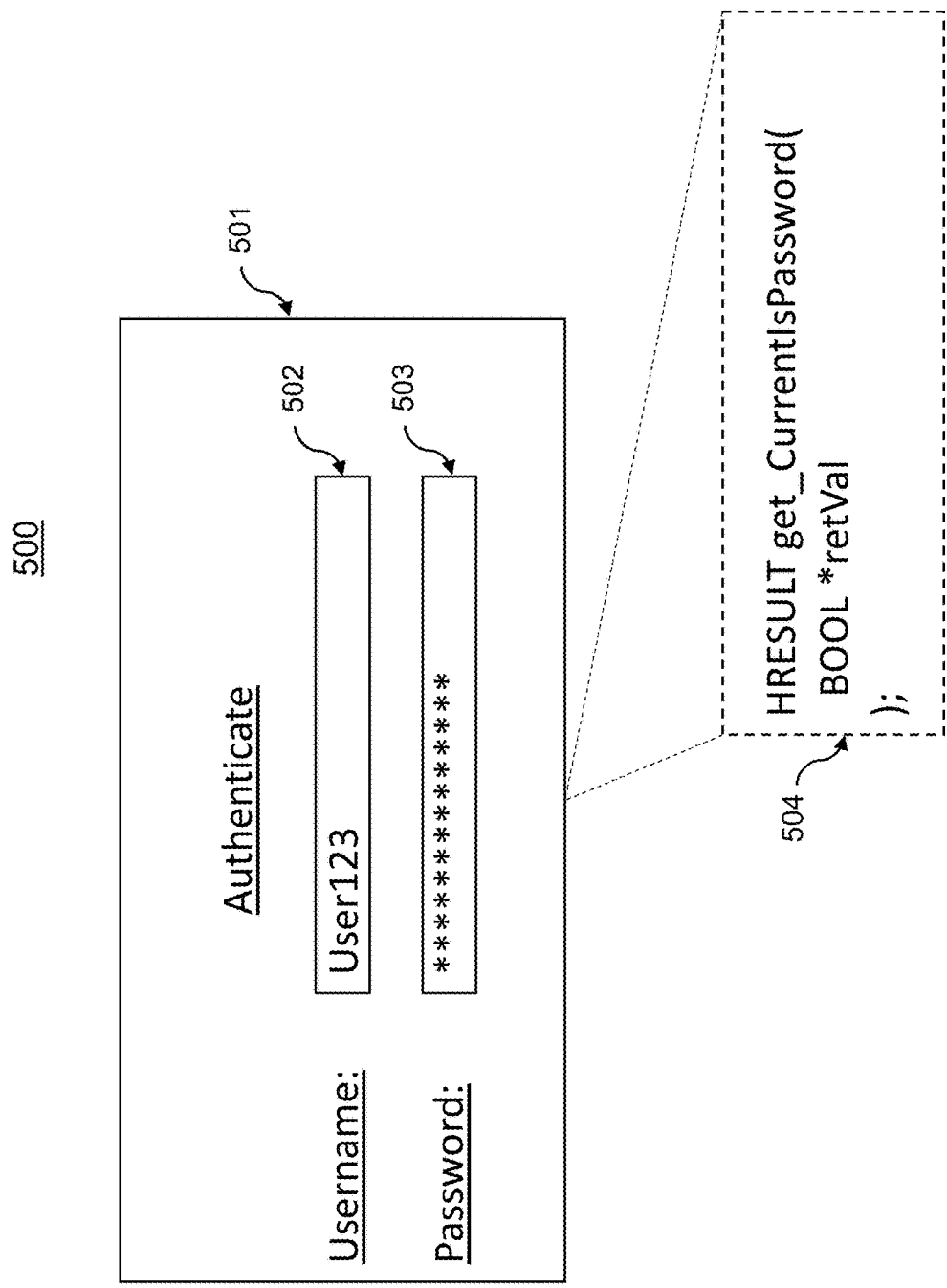
FIG. 5 is a block diagram of exemplary graphical user interface elements having associated properties that may be analyzed for instances of sensitive data entry in accordance with disclosed embodiments.

FIG. 5 illustrates an exemplary graphical user interface 500 including elements having associated properties that may be analyzed for instances of sensitive data entry. As with interfaces 200-400, interface 500 may be implemented via a variety of different types of applications, such as browsers and other applications. Interface 500 may be received or rendered by client computers 101, virtual instances 105, or IoT devices 108.

In some embodiments, for example, interface 500 may include a window or interface 501 having one or more properties that may be analyzed. For example, in a Windows™ operating system environment, interface 501 may have one or more IUIAutomationElement properties to facilitate the display and handling of user interfaces. In the example of FIG. 5, interface 501 is a logon or authentication interface, including a username field 502 and password field 503. If interface 501 is implemented based on the IUIAutomationElement::get_CurrentIsPassword method, interface 501 may have proprieties 504 indicating that interface 501 includes a prompt for a user to enter a password or other sensitive data. For example, the properties 504 may include the property:

HRESULT get_CurrentIsPassword(
   BOOL*retVal
);

In various other embodiments, interface 501 may have different properties which may also indicate a prompt to a user to input sensitive data. For example, if the interface 501 is developed based on the IUIAutomationElement::get_CachedIsPassword method, it may have an associated property 504 of:

HRESULT get_CachedIsPassword(
   BOOL*retVal)
);

In additional embodiments, prior knowledge of secrets or credentials (e.g., passwords, tokens, etc.) may be utilized to identify particular processes or applications as calling for the input of sensitive data. For example, if one or more secrets are known (e.g., an administrator's password, or a testing/artificial password), the process memory of client computers 101, virtual instances 105, or IoT devices 108 may be parsed (e.g., periodically or on-demand) to look for instances of those known passwords. Based on this analysis, particular applications that use such known passwords (e.g., involve users entering such passwords, or involve applications calling such passwords from local memory 103, 107, 110) may be identified as sensitive. Based on the identification of such applications, a control action may be implemented as further discussed below. For example, for such sensitive applications, a command may be implemented to wipe temporary memory 103, 107, 110 before a session in the application ends.

Figure 6:
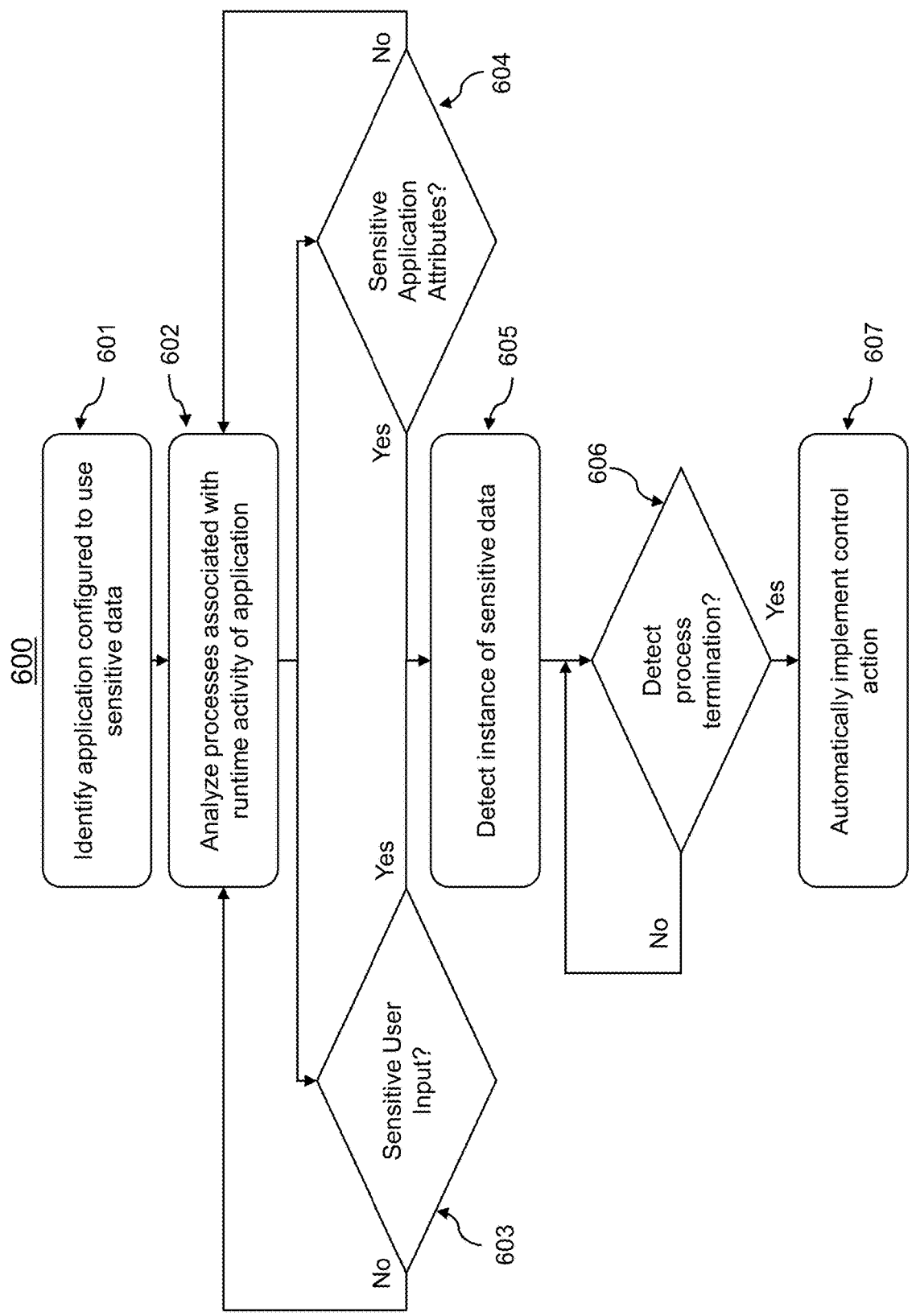
FIG. 6 is a flowchart depicting an exemplary process for discovering and controlling sensitive data stored in temporary access memory in accordance with disclosed embodiments.

FIG. 6 is a flowchart depicting an exemplary process 600 for discovering and controlling sensitive data stored in temporary access memory. Consistent with FIG. 1, process 600 may be implemented via a security agent running on client computers 101, virtual instances 105, or IoT devices 108. In other embodiments, process 600 may operate remotely (e.g., at a security server) and function to protect client computers 101, virtual instances 105, or IoT devices 108. As discussed above, sensitive data may be stored in temporary memory 103, 107, 110 in several different circumstances. For example, passwords or other credentials may be stored or recalled from memory as part of logon processes. Further, sensitive personal data (e.g., financial data, medical data, social data, etc.) may be stored or recalled from memory as part of the operation of applications such as browsers, social media applications, business applications, etc. Additionally, virtual instances 105 may utilize secrets, credentials, tokens, or other sensitive data in their secure communications with secure resources or with each other. Such sensitive data may be stored in temporary memory 107.

In operation 601, process 600 may include identifying an application configured to perform one or more secure functions using sensitive data. As discussed above, the application may be configured to store or access the sensitive data in a temporary access memory accessible to the application (e.g., temporary memory 103, 107, 110). The identification of the application may occur in several ways. For example, in some embodiments process 600 may include periodically accessing, or accessing on-demand, a process listing or log. The process listing or log (e.g., Windows™ Task Manager) may include a listing of running applications and/or background processes, as well as associated performance data (e.g., CPU usage, memory usage, disk usage, network usage, etc.). In some embodiments, process 600 may focus on applications and processes that access memory (as opposed to disk), or have accessed memory within a threshold amount of time (e.g., the last minute, hour, day, etc.). According to such embodiments, applications or processes that do not access memory (e.g., altogether, or within the threshold amount of time) may be disregarded in the analysis. In other embodiments, the identification of applications or processes in operation 601 may follow operation 605, where instances of sensitive data are affirmatively identified.

In operation 602, process 600 includes analyzing one or more processes associated with runtime activity of the application. This analysis may occur in several ways. Consistent with FIGS. 2-5, the analysis may examine sensitive data based on user input in operation 603 and/or application attributes in operation 604. In some embodiments, process 600 includes only one of operations 603 and 604, while in other embodiments both are performed. For example, operations 603 and 604 may be performed on a Boolean OR basis, where if either operation is satisfied in the affirmative process 600 will continue to operation 605. In other embodiments, operations 603 and 604 are performed based on a Boolean AND basis, where both must be satisfied in the affirmative to proceed to operation 605. In alternative embodiments, process 600 is only configured to implement one of operations 603 or 604.

Operation 603 may analyze various types of user input, consistent with the embodiments of FIGS. 2-5 above. For example, with reference to FIG. 2, the analysis may involve parsing textual source content underlying a web document (e.g., underlying HTML, JavaScript, XML, CSS, etc.). Based on the source textual content, keywords may be identified that are indicative of prompts for users to enter sensitive data. Further, as discussed in connection with FIG. 3, operation 603 may analyze a secure logon interface being generated as part of a browser or other application. In some embodiments, this may include analyzing text (e.g., via OCR, or monitoring process commands) included in the interface 301 or displayed in the interface 301. Similarly, with respect to FIG. 4, this may include analyzing textual input in interface 401, such as via OCR or monitoring process commands. Further, in embodiments where a password or other secret is known, operation 603 may include scanning source content, processes, and user interfaces for instances of the known secret being entered.

In operation 604, process 600 may include various techniques of analyzing attributes of applications or processes being utilized on client computers 101, virtual instances 105, or IoT devices 108. For example, as discussed above, this may include scanning processes for particular APIs being called that use secrets or credentials. Examples of such APIs may include, for instance, LogonUser\LogonUserEx, ChangeAccountPasswordA, KerbInteractiveUnlockLogonInit, CredPackAuthenticationBuffer, LsaLogonUser, LsaApLogonUser, CredUIPromptForCredentials, and various others. Additionally, this may include using API hooking tools, such as Detours in Windows™ environments to detect use of APIs and determine that secrets or credentials are being used in a process. Through such hooking tools, operating system API calls may be monitored and potentially intercepted. Accordingly, if an API involving credentials or secrets is called, it may be immediately detected through Detours at runtime and potentially diverted for a control action, as discussed further below. Additionally, in some embodiments operation 604 may include analyzing properties associated with user interface elements. As discussed above, some interface elements may have properties indicating that the interface elements prompt users to enter credentials or other sensitive date. Examples may include get_CurrentIsPassword, get_CachedIsPassword, and various others. In further embodiments, operation 604 may include analyzing cached text associated with an application. The cached text (e.g., stored in a browser cache, application cache, etc.) may include operation commands, user input, or other text. As discussed above, keyword analysis may be performed on such text (e.g., identifying uses of sensitive words such as "credit card," "social security number," etc.). Additionally, in some embodiments operation 604 may involve analyzing virtual instances 105 for instances of embedded or preprogrammed credentials. If the underlying source image for virtual instances 105, or the actual virtual instances 105 themselves, are detected to involve embedded or preprogrammed credentials, they may be classified as potentially requiring a control action as discussed below. Similarly, if virtual instances 105 are detected to be communicating or asserting credentials, they may likewise be classified as requiring a control action.

In operation 605, once an application or process is detected to involve credentials or secrets, an instance of sensitive data may be identified. In some embodiments, operation 605 is performed by classifying a particular application or process as one calling for users to enter sensitive data or secrets. In further embodiments, operation 605 may also involve identifying where within a particular application portion or element (e.g., what line of code in an HTML document, what graphical user interface element, what interface property, what API, etc.) is responsible for the prompt to the user to enter sensitive data or credentials. Applications or processes that are identified in operation 605 may be added to a list of sensitive applications or processes.

In some embodiments, operation 605 further includes analyzing the particular process or application to determine whether it includes a command to wipe memory (e.g., memory 103, 107, 110) before the application or process session terminates. For example, this may include analyzing the code of the application or process itself (e.g., the HTML or JavaScript code of a web page). Further, this may include monitoring memory (e.g., memory 103, 107, 110) and monitoring the termination of a session. If the session terminates without the memory being wiped, the application may be designated as one that does not wipe memory upon a termination of a session. As discussed further below, such applications or processes may be classified as potentially sensitive and insecure. Because such applications may allow for credentials or sensitive data to remain in memory after a session ends, and potentially indefinitely, they may be selected for control actions.

In operation 606, the termination of an application or process is monitored. This may involve, for example, monitoring a listing or log of running processes (e.g., Task Manager in Windows™ environments). Further, this may involve using a tool such as Detours to monitor the execution and operation of processes. As long as a process is running and a session has not terminated, operation 606 may continue looking for a termination. Once a termination of a session is detected, process 600 may proceed to operation 607.

In operation 607, process 600 may implement a control action for the process or application being monitored. Various different types of control actions may be implemented. In some embodiments, the control action is implemented locally (e.g., at client computers 101, virtual instances 105, or IoT devices 108), while in other embodiments the control action may be implemented remotely at a security server or credentials vault 111.

For example, the control action may include using kernel drivers to protect process memory. Such a kernel driver may use a native API on a processor or operating system (e.g., locally on client computers 101, virtual instances 105, or IoT devices 108). In some embodiments, the kernel driver may be configured to prohibit reading, copying, or modifying memory (e.g., memory 103, 107, 110) contents associated an application or process being monitored. In other embodiments, the kernel driver may be configured to automatically wipe memory (e.g., memory 103, 107, 110) contents before a monitored process or application terminates. This memory wiping may include wiping the entire memory. Alternatively, in embodiments where the specific location of sensitive data entry is tracked (e.g., based on lines of code in a web page document, specific graphical user interface elements, specific interface properties, specific APIs, etc.), a portion of the memory may be wiped corresponding to the sensitive data entry. According to this technique, memory (e.g., memory 103, 107, 110) may selectively be wiped to erase only the entry of sensitive data or credentials. As another alternative, memory may be wiped based on a time period. For example, if the time a particular monitored application or process begun execution is tracked, the memory may be wiped as of a time just before execution began. For example, if the timestamp associated with a process or application beginning execution is "2020-03-23 10:40:15.935739500 (EST)" the memory may be wiped to erase all newly modified or written data after that timestamp, while all prior memory contents may be preserved.

In some embodiments, the control action may include notifying security applications or personnel about particular applications or processes determined to not wipe memory before terminating. For example, as discussed above, if a process or application is determined to involve entry of secrets or credentials, but does not wipe memory before the process or application terminates, it may be designated as potentially insecure. In that event, a control action may include reporting the application or process to an administrator or adding it to a list of applications deemed insecure. Further, in some embodiments the control action may also monitor (e.g., via use of Detours or other hooking tools) processors and applications that may attempt to read memory (e.g., memory 103, 107, 110). Such applications and processes may be deemed suspicious or malicious.

In some embodiments, the control action may include triggering rotation of secrets or sensitive data. For example, operation 607 may include generating a prompt to a user of client computers 101, virtual instances 105, or IoT devices 108 to change their password or credential. Alternatively, this may include prompting credentials vault 111 to rotate a password, credential, token, or other secret associated with the user or the monitored process or application. Upon rotation of the secret, the old secret will become inactive and useable, while a new replacement secret will become operative.

In some embodiments, the control action in operation 607 may be based on a time that sensitive data or secrets were stored in memory (e.g., memory 103, 107, 110). For example, even if an application or process being monitored has not closed or terminated, a control action may be performed if it remains open for a threshold period of time (e.g., one minute, one hour, one day, etc.). If the threshold of time is met, the control action may be performed, such as by wiping the contents of the memory as discussed above.

In further embodiments, the control action in operation 607 may include preventing keystroke logging operations. For example, some security software tools and other software may operate by monitoring user session keystrokes (e.g., via a keyboard, touchscreen, etc.) for logging or audit purposes. Nevertheless, when a user in such a session enters sensitive data or secrets, the resulting sensitive data or secret may be captured via keystroke logging and stored by potentially unauthorized third-parties (e.g., auditors or regulators). In order to protect against users' sensitive data or secrets from being made available in this manner to unauthorized third-parties, the control action may include disabling or preventing keystroke logging. For example, using a hooking or kernel API tool, attempts to record keystrokes may be blocked or skipped.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for discovering and controlling sensitive data stored in temporary access memory, the operations comprising:
    identifying an application configured to perform one or more secure functions using sensitive data, wherein the application is configured to store or access the sensitive data in a temporary access memory accessible to the application;
    analyzing one or more processes associated with runtime activity of the application;
    detecting, based on the analyzing, an instance of the sensitive data, wherein the detecting is based on at least one of:
        analyzing input from a user to the application, or
        analyzing attributes of the application; and
    automatically implementing, based on the detecting, a control action to limit the accessibility of the sensitive data in the temporary access memory.

2. The non-transitory computer readable medium of claim 1, wherein analyzing the input from the user to the application comprises performing character recognition on data input by the user.

3. The non-transitory computer readable medium of claim 2, wherein the data input by the user is detected based on an action performed by the user that precedes the data input.

4. The non-transitory computer readable medium of claim 1, wherein analyzing the attributes of the application comprises identifying an application programming interface associated with the application that has a function involving the sensitive data.

5. The non-transitory computer readable medium of claim 4, wherein the application programming interface is an operating system application programming interface.

6. The non-transitory computer readable medium of claim 1, wherein analyzing the attributes of the application comprises detecting a response from an application programming interface hook.

7. The non-transitory computer readable medium of claim 1, wherein analyzing the attributes of the application comprises analyzing cached text associated with the application.

8. The non-transitory computer readable medium of claim 1, wherein analyzing the attributes of the application comprises identifying interface elements of the application.

9. The non-transitory computer readable medium of claim 1, wherein the control action comprises at least one of: invoking a kernel driver, flushing the temporary access memory, generating an alert regarding the sensitive data, rotating a credential associated with the sensitive data or the user, or generating a prompt to the user.

10. The non-transitory computer readable medium of claim 1, wherein the sensitive data comprises at least one of: a credential or secret of the user, sensitive financial information of the user, sensitive personal information of the user, or a privileged access token.

11. A computer-implemented method for discovering and controlling sensitive data stored in temporary access memory, the method comprising:
    identifying an application configured to perform one or more secure functions using sensitive data, wherein the application is configured to store or access the sensitive data in a temporary access memory accessible to the application;
    analyzing one or more processes associated with runtime activity of the application;
    detecting, based on the analyzing, an instance of the sensitive data, wherein the detecting is based on at least one of:
        analyzing input from a user to the application, or
        analyzing attributes of the application; and
    automatically implementing, based on the detecting, a control action to limit the accessibility of the sensitive data in the temporary access memory.

12. The computer-implemented method of claim 11, wherein the temporary access memory is a random access memory.

13. The computer-implemented method of claim 11, wherein the temporary access memory is a browser cache.

14. The computer-implemented method of claim 11, wherein the control action is implemented before the one or more processes terminate.

15. The computer-implemented method of claim 11, wherein the instance of the sensitive data is predetermined before the detecting.

16. The computer-implemented method of claim 11, wherein the detecting comprises both analyzing the input from the user to the application and analyzing the attributes of the application.

17. The computer-implemented method of claim 11, wherein analyzing the input from the user to the application comprises performing character recognition on data input by the user.

18. The computer-implemented method of claim 11, wherein analyzing the attributes of the application comprises identifying an application programming interface associated with the application that has a function involving the sensitive data.

19. The computer-implemented method of claim 11, wherein analyzing the attributes of the application comprises detecting a response from an application programming interface hook.

20. The computer-implemented method of claim 11, wherein analyzing the attributes of the application comprises analyzing cached text associated with the application.

* * * * *